United States Patent
Shows et al.

(10) Patent No.: US 9,606,571 B2
(45) Date of Patent: Mar. 28, 2017

(54) SYSTEMS AND METHODS FOR APPLICATION-AWARE INFORMATION HANDLING RESOURCE THROTTLING

(71) Applicant: Dell Products L.P., Round Rock, TX (US)

(72) Inventors: Thomas Alexander Shows, Cedar Park, TX (US); Travis C. North, Cedar Park, TX (US); Deeder M. Aurongzeb, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/807,668

(22) Filed: Jul. 23, 2015

(65) Prior Publication Data

US 2017/0023969 A1 Jan. 26, 2017

(51) Int. Cl.
*G06F 1/26* (2006.01)
*G06F 1/32* (2006.01)
*G06F 1/04* (2006.01)
*G06F 1/20* (2006.01)

(52) U.S. Cl.
CPC ............. *G06F 1/04* (2013.01); *G06F 1/203* (2013.01); *G06F 1/206* (2013.01); *G06F 1/3203* (2013.01); *G06F 1/324* (2013.01); *G06F 1/3237* (2013.01); *G06F 1/3287* (2013.01); *Y02B 60/1217* (2013.01); *Y02B 60/1275* (2013.01)

(58) Field of Classification Search
CPC ........ G06F 1/206; G06F 1/3203; G06F 1/324; G06F 1/3237; G06F 1/3287; Y02B 60/1217; Y02B 60/1275
USPC ................................. 713/300, 320, 322, 600
See application file for complete search history.

(56) References Cited

U.S. PATENT DOCUMENTS

| | | | | |
|---|---|---|---|---|
| 2003/0097603 A1* | 5/2003 | Athas | ...................... | G06F 1/206 713/500 |
| 2013/0117594 A1* | 5/2013 | Thomas | ................... | G06F 1/203 713/322 |

* cited by examiner

*Primary Examiner* — Michael J Brown
(74) *Attorney, Agent, or Firm* — Jackson Walker L.L.P.

(57) ABSTRACT

In accordance with embodiments of the present disclosure, an information handling system may include a plurality of information handling resources having shared heat-rejecting media for transferring heat from the plurality of information handling resources and a thermal management driver. The thermal management driver may comprise a program of instructions embodied in computer-readable media and executable by a processor, the thermal management driver configured to determine a respective workload associated with each of the plurality of information handling resources and control individual operating frequencies of the plurality of information handling resources based on the respective workloads and a temperature associated with the heat-rejecting media.

20 Claims, 2 Drawing Sheets

SYSTEMS AND METHODS FOR APPLICATION-AWARE INFORMATION HANDLING RESOURCE THROTTLING

TECHNICAL FIELD

The present disclosure relates in general to information handling systems, and more particularly to application-aware throttling of information handling resources in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As storage devices and other components in information handling systems have increased in clock speed and power consumption, the amount of heat produced by such components as a side-effect of normal operation has also increased. Various heat-rejecting media may be used to cool heat-generating components, including fluids (e.g., air via a fan, liquid via a pump-connected liquid conduit) conveyed proximate to the components, thermally-conductive solids (e.g., heatsinks, heat pipes, heat spreader plates, etc.) coupled to such components, or a combination thereof. In some instances, it is often beneficial that a heat-rejection medium is shared among multiple components. For example, in an information handling system, a heat-rejection medium may be used to cool both a processor and a co-processor (e.g., graphics processor). However, when multiple components with shared heat-rejecting media are driven with high workloads, temperature limits associated with the components and/or the heat-rejecting media may be exceeded, which may lead to blind throttling of all components cooled by the shared heat-rejecting media, which may negatively affect performance.

SUMMARY

In accordance with the teachings of the present disclosure, the disadvantages and problems associated with thermal control related to information handling resources cooled by shared heat-rejection media may be reduced or eliminated.

In accordance with embodiments of the present disclosure, an information handling system may include a plurality of information handling resources having shared heat-rejecting media for transferring heat from the plurality of information handling resources and a thermal management driver. The thermal management driver may comprise a program of instructions embodied in computer-readable media and executable by a processor, the thermal management driver configured to determine a respective workload associated with each of the plurality of information handling resources and control individual operating frequencies of the plurality of information handling resources based on the respective workloads and a temperature associated with the heat-rejecting media.

In accordance with these and other embodiments of the present disclosure, a method may include determining a respective workload associated with each of a plurality of information handling resources having shared heat-rejecting media for transferring heat from the plurality of information handling resources and controlling individual operating frequencies of the plurality of information handling resources based on the respective workloads and a temperature associated with the heat-rejecting media.

In accordance with these and other embodiments of the present disclosure, an article of manufacture may include a non-transitory computer-readable medium and computer-executable instructions carried on the computer-readable medium. The instructions may be readable by a processor, the instructions, when read and executed, for causing the processor to determine a respective workload associated with each of a plurality of information handling resources having shared heat-rejecting media for transferring heat from the plurality of information handling resources and control individual operating frequencies of the plurality of information handling resources based on the respective workloads and a temperature associated with the heat-rejecting media.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
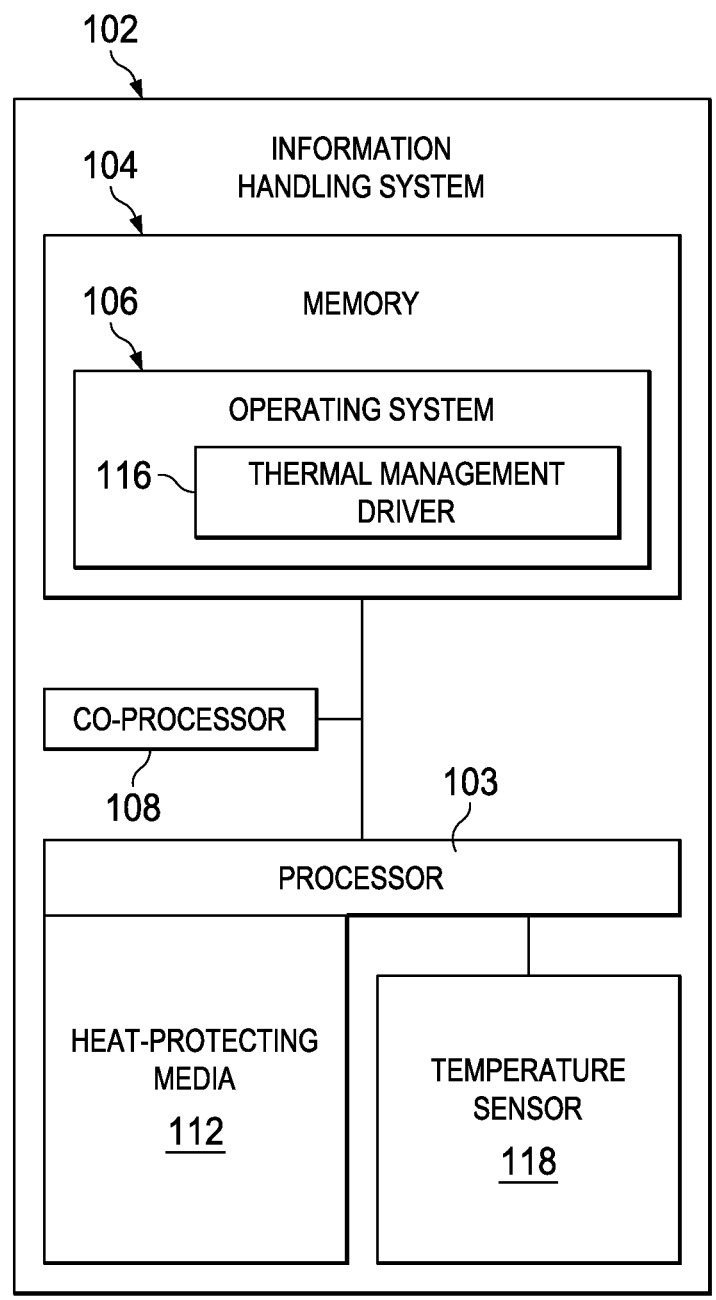
FIG. 1 illustrates a block diagram of an example information handling system, in accordance with certain embodiments of the present disclosure.
Figure 2:
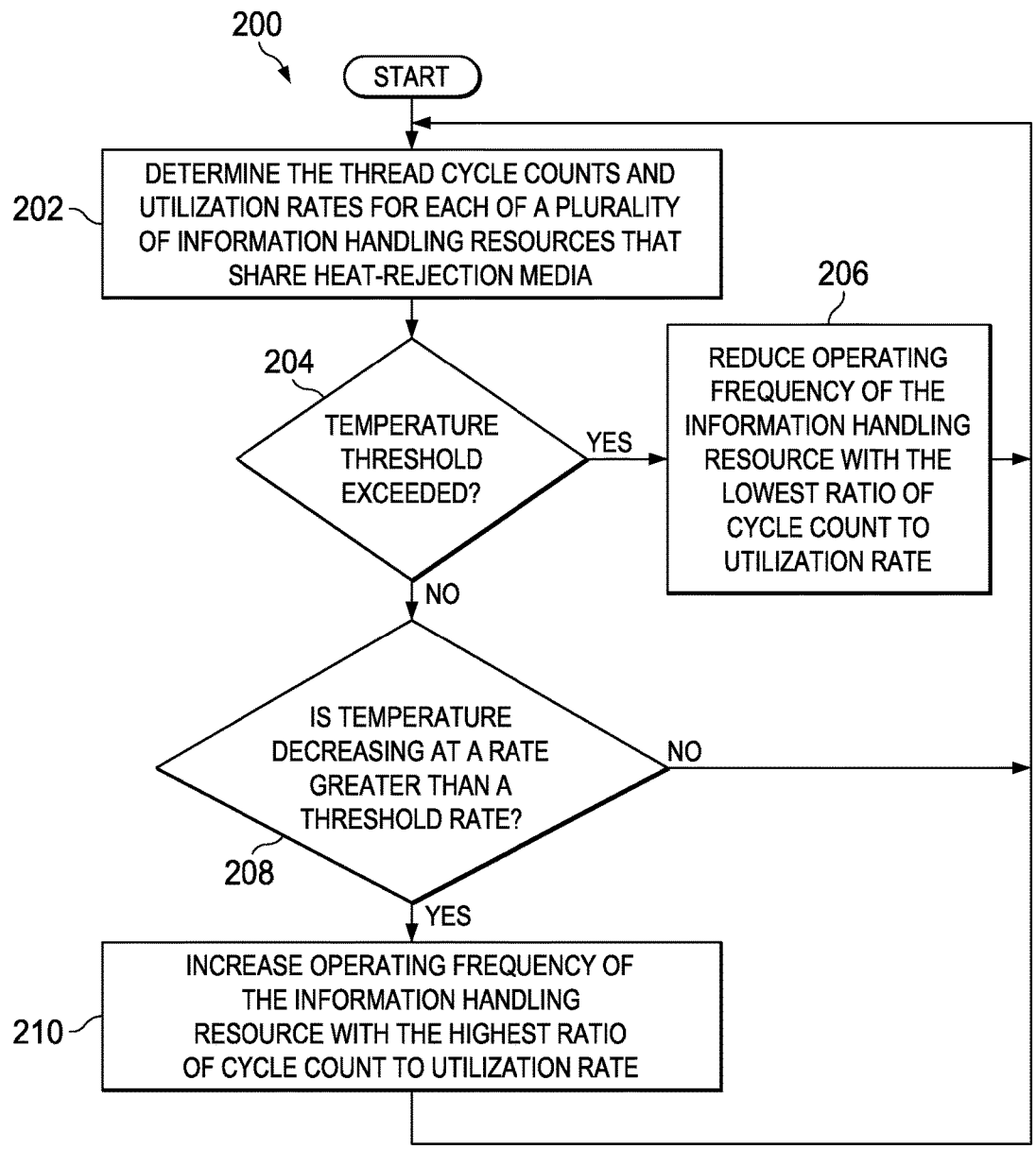
FIG. 2 illustrates a flow chart of an example method for application-aware information handling resource throttling, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, a co-processor 108 communicatively coupled to processor 103 and memory 104, heat-rejecting media 112 thermally coupled to processor 103 and co-processor 108, and one or more temperature sensors 118 thermally coupled to heat-rejecting media 112 and communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have operating system 106 stored thereon. Operating system 106 may be any program of executable instructions, or aggregation of programs of executable instructions, configured to manage and/or control the allocation and usage of hardware resources (e.g., processor 103, memory 104, and/or other information handling resources) and provide an interface between such hardware resources and application programs hosted by operating system 106, and thus may act as a host for application programs to be executed by information handling system 102. Active portions of operating system 106 may be read and executed by processor 103 in order to carry out the functionality of operating system 106. Examples of operating system 106 may include, without limitation, Windows, MacOS, UNIX, LINUX, Android, iOS, or any other closed or open source operating system.

As depicted in FIG. 1, operating system 106 may include a thermal management driver 116. Thermal management driver 116 may comprise a program of instructions configured to, when read and executed by processor 103, provide an interface between operating system 106 and processor 103 and co-processor 108 to control performance (e.g., operating frequency) of processor 103 and co-processor 108. As described in greater detail below, driver 116 may, based on thermal information communicated from temperature sensor 118, control the operating frequencies of processor 103 and co-processor 108 to maintain the highest possible level of processing performance of processor 103 and co-processor 108 while satisfying thermal constraints of information handling system 102. In particular, under thermally-challenging conditions (as indicated by temperature sensor 118), driver 116 may decrease operating frequency of either processor 103 or co-processor 108 based on which of the two information handling resources has the smallest workload. On the other hand, when thermally-challenging conditions are not present, driver 116 may increase operating frequency of either processor 103 or co-processor 108 based on which of the two information handling resources has the highest workload.

Although operating system 106 is depicted as being stored on memory 104, in some embodiments, operating system 106 may be stored on a computer-readable medium other than memory 104, and read into memory 104 for execution by processor 103.

Co-processor 108 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, co-processor 108 may interpret and/or execute program instructions and/or process data stored in memory 104 and/or another component of information handling system 102. In these and other embodiments, co-processor 108 may be a special-purpose processor for executing specialized or particular instructions, such as a graphics processing unit configured to rapidly manipulate and alter memory (e.g., memory 104) to accelerate the creation of images in a frame buffer intended for output to a display.

Heat-rejecting media 112 may include any system, device, or apparatus configured to transfer heat from an information handling resource, thus reducing a temperature of the information handling resource. For example, heat-rejection media 112 may include a fluid conveyed proximate to an information handling resource (e.g., air conveyed by a fan or blower, liquid conveyed via a liquid conduit by a pump, etc.), a solid thermally coupled to the information handling resource (e.g., heatpipe, heat spreader, heatsink, etc.). As shown in FIG. 1, heat-rejecting media 112 may be thermally coupled to and thus shared by multiple information handling resources of information handling system 102 (e.g., processor 103 and co-processor 108), such that heat is transferred from multiple information handling resources to heat-rejecting media 112.

Temperature sensor 118 may be any system, device, or apparatus (e.g., a thermometer, thermistor, etc.) configured to communicate a signal to processor 103 indicative of a temperature within information handling system 102. In particular embodiments, temperature sensor 118 may sense a temperature within and/or proximate to heat-rejecting media 112. Although FIG. 1 depicts temperature sensor 118 as being thermally coupled to heat-rejecting media 112, in some embodiments, temperature sensor 118 may detect a temperature other than that within or proximate to heat-rejection media 112.

In addition to processor 103, memory 104, co-processor 108, and temperature sensor 118, information handling system 102 may include one or more other information handling resources.

FIG. 2 illustrates a flow chart of an example method 200 for application-aware information handling resource throttling, in accordance with certain embodiments of the present disclosure. According to some embodiments, method 200 may begin at step 202. As noted above, teachings of the present disclosure may be implemented in a variety of configurations of information handling system 102.

At step 202, thermal management driver 116 may determine the thread cycle counts (e.g., operating frequency) and utilization rates (e.g., the percentage of cycle counts in which an instruction is executed) for each of a plurality of information handling resources (e.g., processor 103 and co-processor 108) that share heat-rejection media (e.g., heat-rejection media 112).

At step 204, thermal management driver 116 may determine whether a temperature (e.g., a temperature measured by temperature sensor 118) associated with the shared heat-rejection media has exceeded a threshold temperature. If the temperature threshold is exceeded, method 200 may proceed to step 206. Otherwise, method 200 may proceed to step 208.

At step 206, in response to the temperature threshold associated with the heat-rejecting media being exceeded, thermal management driver 116 may cause the operating frequency of the information handling resource with the lowest ratio of cycle count to utilization rate to be reduced (e.g., to a nominal frequency of such information handling resource). After completion of step 206, method 200 may return again to step 202.

At step 208, in response to the temperature associated with the heat-rejecting media being below the temperature threshold, thermal management driver 116 may determine whether the temperature associated with the heat-rejecting media is decreasing at a rate greater than a threshold rate. If the temperature is decreasing at a rate greater than the threshold rate, method 200 may proceed to step 210. Otherwise, method 200 may proceed again to step 202.

At step 210, in response to the temperature decreasing at a rate greater than the threshold rate, thermal management driver 116 may cause the operating frequency of the information handling resource with the highest ratio of cycle count to utilization rate to be increased (e.g., to a maximum operating frequency of such information handling resource). After completion of step 210, method 200 may proceed again to step 202.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Although the systems and methods described above contemplate application-aware throttling of processor 103 and co-processor 108, in some embodiments the systems and methods described above can be applied to information handling resources other than processor 103 and co-processor 108. In addition, although systems and methods described above contemplate application-aware throttling of two information handling resources, in some embodiments the systems and methods described above can be applied to any number of information handling resources.

As used herein, when two or more elements are referred to as "coupled" to one another, such term indicates that such two or more elements are in electronic communication, thermal communication, or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a plurality of information handling resources having shared heat-rejecting media for transferring heat from the plurality of information handling resources; and
   a thermal management driver comprising a program of instructions embodied in non-transitory computer-readable media and executable by a processor, the thermal management driver configured to:
   determine a respective workload associated with each of the plurality of information handling resources; and
   for each information handling resource of the plurality of information handling resources, control a respective individual operating frequency for the information handling resource independent from operating frequencies of the plurality of information handling resources of the other information handling resources based on the respective workloads and a temperature associated with the heat-rejecting media.

2. The information handling system of claim 1, wherein the respective workload for a particular information handling resource of the plurality of information handling resources is defined by a ratio of a cycle count for the particular information handling resource to a utilization rate of the particular information handling resource.

3. The information handling system of claim 1, wherein the thermal management driver is configured to, in order to control individual operating frequencies of the plurality of information handling resources, reduce an operating frequency of an information handling resource of the plurality of information handling resources having a respective workload lesser than the respective workloads of the other information handling resources of the plurality of information handling resources responsive to a temperature associated with the heat-rejecting media exceeding a threshold.

4. The information handling system of claim 1, wherein the thermal management driver is configured to, in order to control individual operating frequencies of the plurality of information handling resources, increase an operating frequency of an information handling resource of the plurality of information handling resources having a respective workload greater than the respective workloads of the other information handling resources of the plurality of information handling resources responsive to a temperature associated with the heat-rejecting media being less than a threshold.

5. The information handling system of claim 1, wherein the thermal management driver is configured to, in order to control individual operating frequencies of the plurality of information handling resources, increase an operating frequency of an information handling resource of the plurality of information handling resources having a respective workload greater than the respective workloads of the other information handling resources of the plurality of information handling resources responsive to a temperature associated with the heat-rejecting media being less than a first threshold and a rate of decrease of the temperature being greater than a second threshold.

6. The information handling system of claim 1, wherein the plurality of information handling resources includes the processor.

7. The information handling system of claim 1, wherein the plurality of information handling resources includes a graphics processing unit.

8. A method comprising:
   determining a respective workload associated with each of a plurality of information handling resources having shared heat-rejecting media for transferring heat from the plurality of information handling resources; and
   for each information handling resource of the plurality of information handling resources, controlling a respective individual operating frequency for the information handling resource independent from operating frequencies of the plurality of information handling resources of the other information handling resources based on the respective workloads and a temperature associated with the heat-rejecting media.

9. The method of claim 8, wherein the respective workload for a particular information handling resource of the plurality of information handling resources is defined by a ratio of a cycle count for the particular information handling resource to a utilization rate of the particular information handling resource.

10. The method of claim 8, wherein controlling individual operating frequencies of the plurality of information handling resources comprises reducing an operating frequency of an information handling resource of the plurality of information handling resources having a respective workload lesser than the respective workloads of the other information handling resources of the plurality of information handling resources responsive to a temperature associated with the heat-rejecting media exceeding a threshold.

11. The method of claim 8, wherein controlling individual operating frequencies of the plurality of information handling resources comprises increasing an operating frequency of an information handling resource of the plurality of information handling resources having a respective workload greater than the respective workloads of the other information handling resources of the plurality of information handling resources responsive to a temperature associated with the heat-rejecting media being less than a threshold.

12. The method of claim 8, wherein controlling individual operating frequencies of the plurality of information handling resources comprises increasing an operating frequency of an information handling resource of the plurality of information handling resources having a respective workload greater than the respective workloads of the other information handling resources of the plurality of information handling resources responsive to a temperature associated with the heat-rejecting media being less than a first threshold and a rate of decrease of the temperature being greater than a second threshold.

13. The method of claim 8, wherein the plurality of information handling resources includes at least one of a processor and a graphics processing unit.

14. An article of manufacture comprising:
   a non-transitory computer-readable medium; and
   computer-executable instructions carried on the computer-readable medium, the instructions readable by a processor, the instructions, when read and executed, for causing the processor to:
   determine a respective workload associated with each of a plurality of information handling resources having shared heat-rejecting media for transferring heat from the plurality of information handling resources; and for each information handling resource of the plurality of information handling resources, control a respective individual operating frequency for the information handling resource independent from operating frequencies of the plurality of information handling resources of the other information handling resources based on the respective workloads and a temperature associated with the heat-rejecting media.

15. The article of claim 14, wherein the respective workload for a particular information handling resource of the plurality of information handling resources is defined by a ratio of a cycle count for the particular information handling resource to a utilization rate of the particular information handling resource.

16. The article of claim 14, wherein controlling individual operating frequencies of the plurality of information handling resources comprises reducing an operating frequency of an information handling resource of the plurality of information handling resources having a respective workload lesser than the respective workloads of the other information handling resources of the plurality of information handling resources responsive to a temperature associated with the heat-rejecting media exceeding a threshold.

17. The article of claim 14, wherein controlling individual operating frequencies of the plurality of information handling resources comprises increasing an operating frequency of an information handling resource of the plurality of information handling resources having a respective workload greater than the respective workloads of the other information handling resources of the plurality of information handling resources responsive to a temperature associated with the heat-rejecting media being less than a threshold.

18. The article of claim 14, wherein controlling individual operating frequencies of the plurality of information handling resources comprises increasing an operating frequency of an information handling resource of the plurality of information handling resources having a respective workload greater than the respective workloads of the other information handling resources of the plurality of information handling resources responsive to a temperature associated with the heat-rejecting media being less than a first threshold and a rate of decrease of the temperature being greater than a second threshold.

19. The article of claim 14, wherein the plurality of information handling resources includes the processor.

20. The article of claim 14, wherein the plurality of information handling resources includes a graphics processing unit.

* * * * *